United States Patent [19]

Gregory et al.

[11] Patent Number: 5,265,747
[45] Date of Patent: Nov. 30, 1993

[54] PLASTIC BEVERAGE CLOSURE

[75] Inventors: James L. Gregory; Dennis J. Burzynski, both of Toledo, Ohio; Bruce J. Rote; Frank L. Sprowl, both of Sturgis, Mich.

[73] Assignee: Owens-Illinois Closure Inc., Toledo, Ohio

[21] Appl. No.: 920,931

[22] Filed: Jul. 28, 1992

[51] Int. Cl.$^5$ .............................................. B65D 53/00
[52] U.S. Cl. .................................. 215/349; 215/307
[58] Field of Search ............... 215/307, 347, 348, 349, 215/350, 351; 220/366

[56] References Cited

U.S. PATENT DOCUMENTS

| | | |
|---|---|---|
| 4,378,893 | 4/1983 | Wilde et al. |
| 4,407,422 | 10/1983 | Wilde et al. ........................ 215/246 |
| 4,418,828 | 12/1983 | Wilde et al. |
| 4,462,502 | 7/1984 | Luenser et al. |
| 4,488,655 | 12/1984 | Itsubo et al. ........................ 215/252 |
| 4,658,976 | 4/1987 | Pohlenz . |
| 4,664,280 | 5/1987 | Whitney et al. .................... 215/350 |
| 4,674,643 | 6/1987 | Wilde et al. ........................ 215/252 |
| 5,050,753 | 9/1991 | Trump et al. ....................... 215/252 |
| 5,064,084 | 11/1991 | McBride et al. .................... 215/350 |

Primary Examiner—Allan N. Shoap
Assistant Examiner—Nova Stucker

[57] ABSTRACT

A plastic beverage closure comprising a base wall, a peripheral skirt and a plurality of threads on the inner surface of the skirt for engagement with the threads of a container which may be made of glass or plastic. The plastic closure includes a compression molded seal extending about the periphery of the inner surface of the base wall and the juncture of the base wall to the peripheral skirt. The closure includes a central axially thickened portion; a channel surrounding the thickened portion and extending radially to an annular radially thickened portion on the skirt at the juncture with the base wall. A concave surface extends from the base of the channel and merges with the surface of the annular portion. A compression molded liner is provided on the thickened portion, channel and concave surface of the closure and defines a planar sealing surface for contact with the end surface of the finish of a container and an arcuate surface for engaging the arcuate surface of a container.

32 Claims, 6 Drawing Sheets

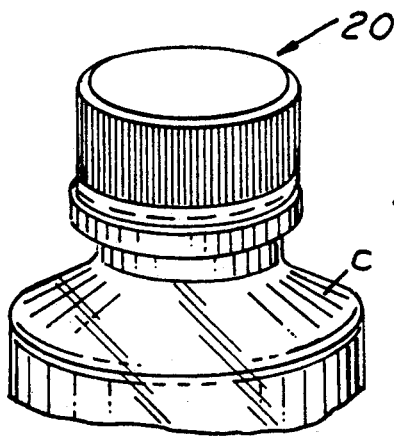
FIG.1
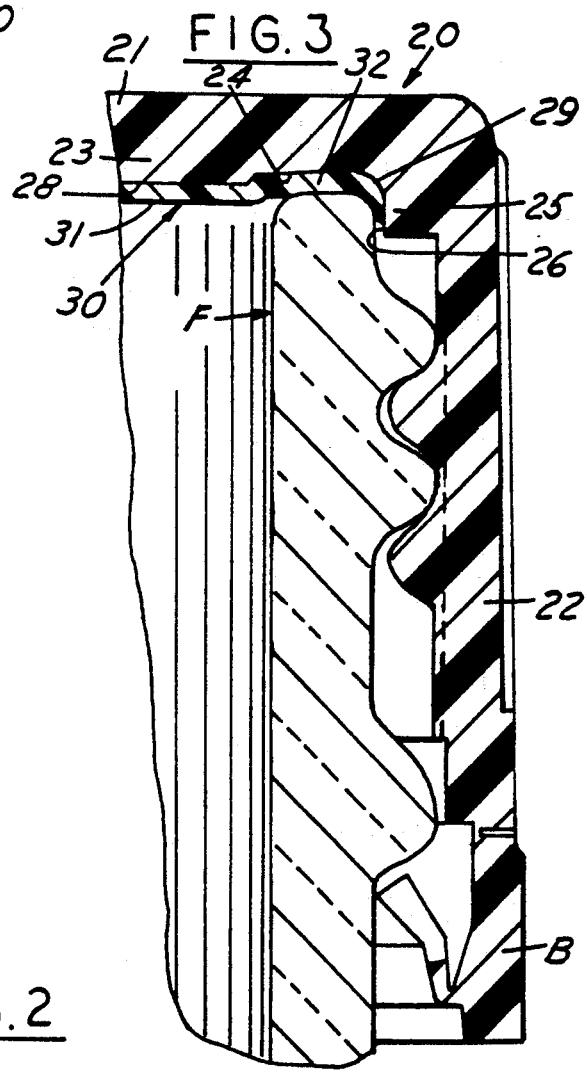
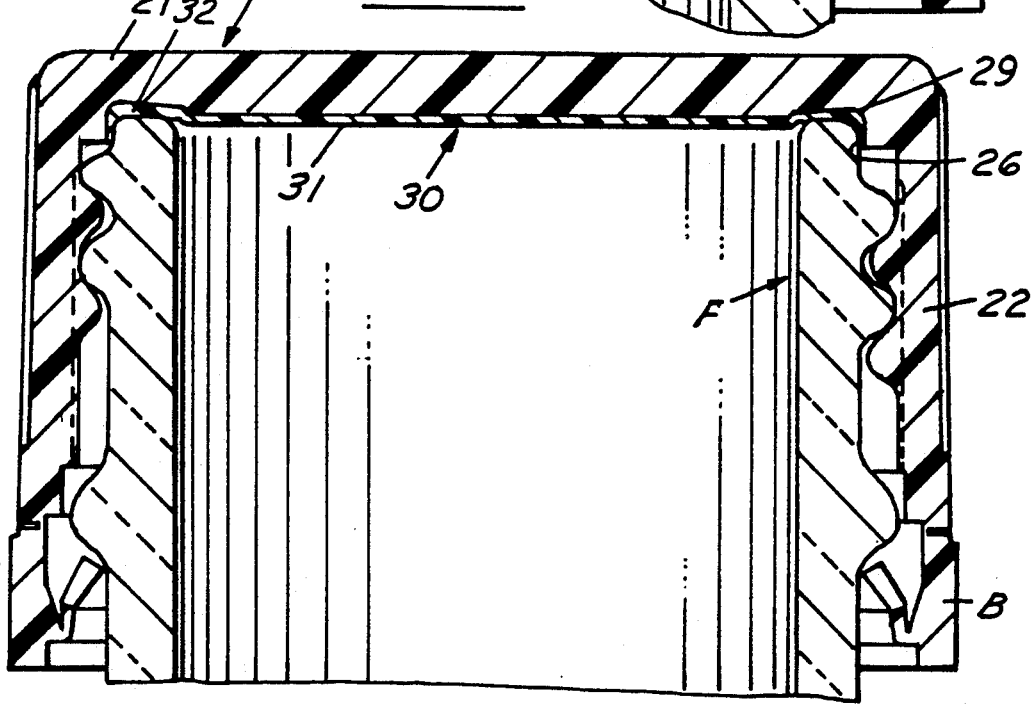

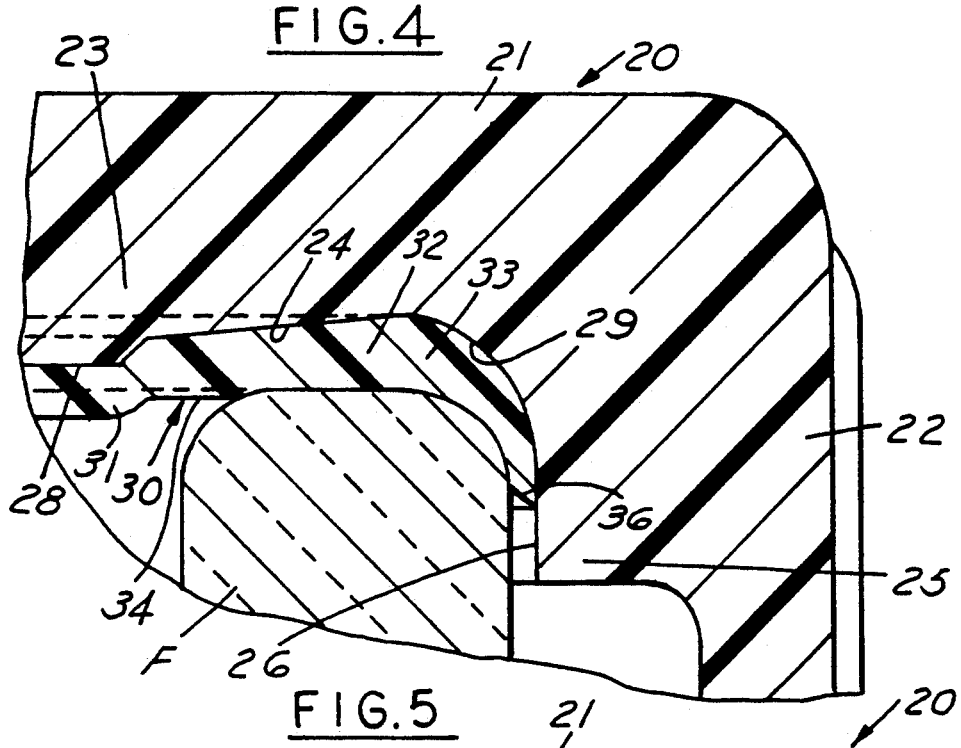
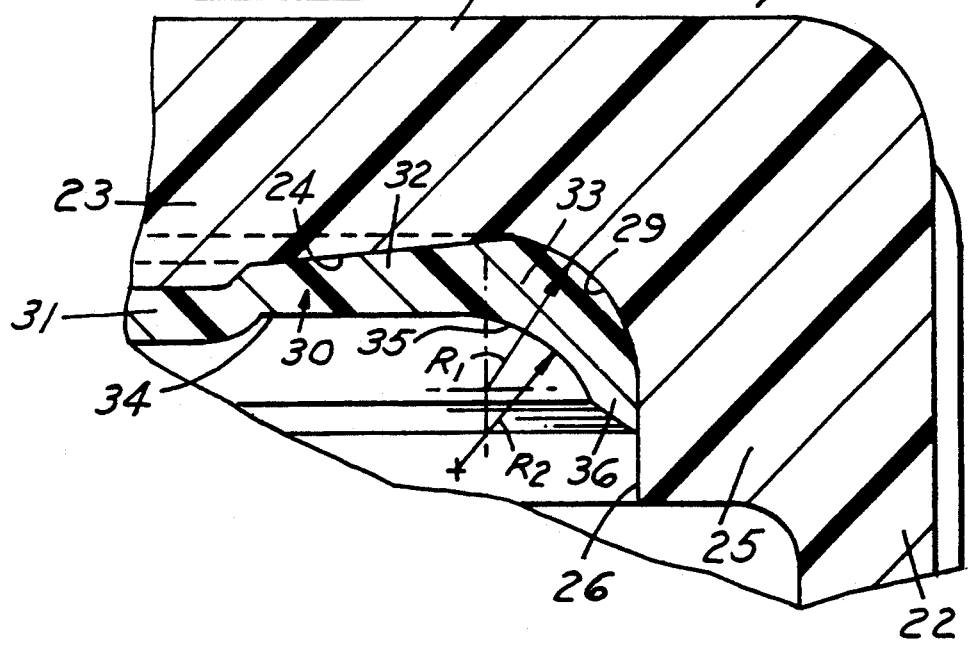

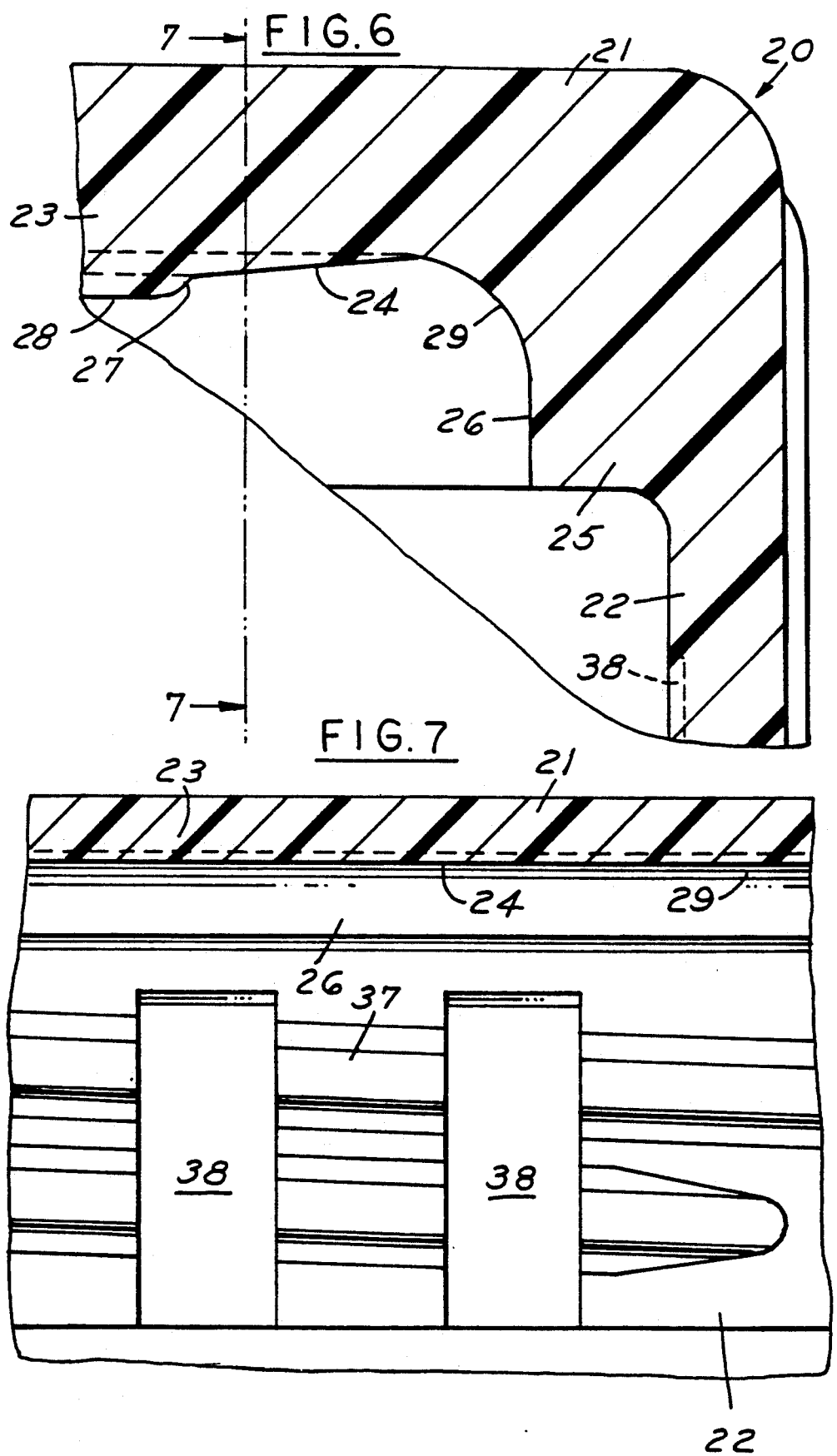

PLASTIC BEVERAGE CLOSURE

This invention relates to plastic beverage closures and such closures when used on glass or plastic containers.

BACKGROUND AND SUMMARY OF THE INVENTION

In the use of plastic beverage closures on glass or plastic containers, it is essential to provide a proper seal for the carbonated beverages in the glass or plastic containers. In addition, it is essential to be able to vent the pressure of the contents as the closure is being unthreaded and before the threads become disengaged in order to facilitate the opening of the contents. In order to vent the contents, the seal must first be released.

In order to provide a proper seal, it has been thought that it is necessary to have a seal on the top surface of the container as well as on the outer cylindrical surface of the finish or neck of the container. Thus, in compression mold liners a satisfactory seal has been provided as shown in, for example, U.S. Pat. Nos. 4,378,893, 4,407,422 and 4,418,828 incorporated herein by reference. In these patents, the closure is provided with an annular lip spaced from the base wall and defining an annular recess and a plastic sealing liner in compression molded such that it is held in position by integral liner-engaging projections on the base wall and the annular lip to form a liner that has an annular sealing bead that engages the outer side wall surface of the container. In another type of plastic beverage closure shown in U.S. Pat. Nos. 4,462,502 and 4,658,976, a circular flexible resilient liner is provided which is rotatable relative to the closure and has a diameter greater than the outside diameter of the container lip. An annular projection is provided at the juncture of the base wall and skirt of the closure and preferably has a configuration when viewed in cross-section which has a horizontal portion, a vertical and a convex portion connecting the horizontal and vertical portion one to the other providing for sealing along an outer cylindrical side surface of the edge of the finish of the container.

In each of the aforementioned constructions, the construction relies on the flexing of the base wall of the closure to enhance the side seal on the cylindrical surface of the container finish.

It has also been found that the nature of the seal provided is such that venting does not occur until a rotation of about 90°-120° of the closure occurs.

Among the objectives of the present invention are to provide a plastic beverage closure which has a seal which will effectively protect the contents of the container which may be under pressure; wherein the closure effectively vents any pressure of the container with a minimal rotation of the closure; which the closure is operable on both glass and plastic containers; wherein the liner material may be of a broad range of materials; which does not require an annular lip on the closure for retaining the sealing liner that might interfere with either the glass or plastic container finish; and which does not rely on a seal with the outer cylindrical surface of the finish of the container.

In accordance with the invention a plastic beverage closure comprising a base wall, a peripheral skirt and a plurality of threads on the inner surface of the skirt for engagement with the threads of a container which may be made of glass or plastic. The plastic closure includes a compression molded seal extending about the periphery of the inner surface of the base wall and the juncture of the base wall to the peripheral skirt. The closure includes a central axially thickened portion; a channel surrounding the thickened portion and extending radially to an annular radially thickened portion on the skirt at the juncture with the base wall. A concave surface extends from the base of the channel and merges with the surface of the annular portion. A compression molded liner is provided on the thickened portion, channel and concave surface of the closure and defines a planar sealing surface for contact with the end surface of the finish of the container and an arcuate surface for engaging the arcuate surface of a container.

DESCRIPTION OF THE DRAWINGS

FIG. 1 is a fragmentary perspective view of a package comprising a plastic carbonated beverage closure and container embodying the invention;

FIG. 2 is a fragmentary vertical sectional view taken on an enlarged scale;

FIG. 3 is a fragmentary sectional view of a portion of FIG. 2 on a further enlarged scale;

FIG. 4 is a fragmentary sectional view of a portion of the container shown in FIG. 3;

FIG. 5 is a fragmentary sectional view of the closure shown in FIG. 4 without the container in position;

FIG. 6 is a fragmentary sectional view similar to FIG. 5 showing the closure before the compression molding liner in place;

FIG. 7 is a fragmentary sectional view taken along the line 7—7 in FIG. 6;

DESCRIPTION

Figure 8:
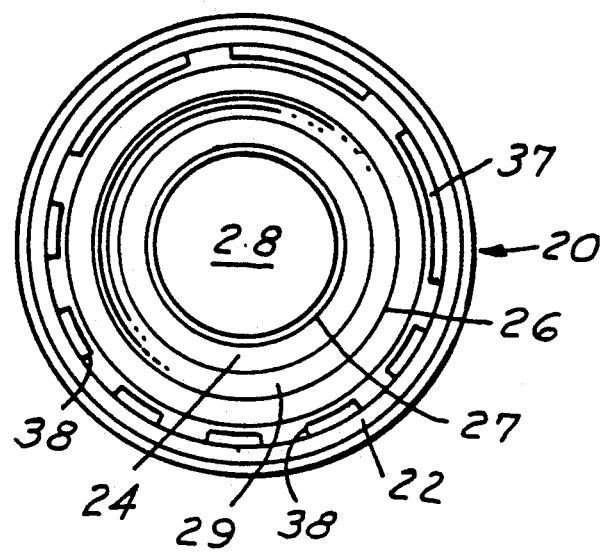
FIG. 8 is a bottom plan view of the closure shown in FIGS. 6 and 7.

Referring to FIGS. 1-8, the carbonated beverage package embodying the invention comprises a plastic closure 20 adapted to be threaded on a container C herein shown as being a glass container. The closure 20 is made of thermoplastic material such as polypropylene or polyethylene for glass and plastic containers including containers that are made of PET (polyethylene terphthalate).

The closure 20 includes a base wall 21 and a peripheral skirt 22. The closure further includes a central thickened portion 23 on its inner surface and an annular channel 24 surrounding the portion 23. The channel 24 is adapted to overlie the upper end of the finish of the container. The skirt 22 of the closure 20 has a radially thickened portion 25 on its inner surface defining a cylindrical surface 26. The base surface of the channel 24 tapers axially inwardly and radially inwardly to an annular tapered surface 27 that extends to the planar surface 28 on the central portion 23 (FIG. 6). The closure 20 includes an annular arcuate surface 29 that has a radius $R_1$ and extends substantially 90° from the outer edge of the channel 24 to the cylindrical surface 26.

As shown in FIGS. 2-5, a liner 30 of resilient material is compression molded in situ on the base wall 22 such that the sealing liner has a central portion 31 of uniform thickness on the inner surface of the central portion 23, a portion 32 along channel 24 and a portion 33 that is thicker at the juncture with the arcuate surface 29 of the closure. The liner 30 extends to the cylindrical surface 26, but has its free edge spaced from the lower edge of portion 25. The cylindrical surface 26 of the closure has a diameter greater than the outer diameter of the upper end of the finish F of the container C.

The liner 30 further includes an annular exterior planar surface 34 on the portion 32 that merges with an arcuate surface 35 of constant radius that extends to the free end 36 of the liner. The center of radius of the curved surface 32 of the closure and the curved surface 35 of the liner are preferably displaced axially and radially as indicated by the radial lines $R_1$, $R_2$ in FIG. 5. Thus, the thickest portion 33 of the liner 30 is at the juncture of the base wall 21 on the skirt 22 and preferably nearer the base wall 21 than the skirt 22. As a result, as shown in FIG. 4, the primary sealing occurs along the planar surface 34 and the curved portion 35 of the free end 36.

The radius $R_2$ of arcuate surface 35 of the liner 30 has its center nearer the axis of the closure 20 than the center of the radius $R_1$ of the arcuate surface 26 of the closure 20. The center of the radius $R_2$ is axially displaced vertically away from the base wall 21 a greater distance than the center of the radius $R_1$. The radius $R_2$ terminates at the free edge 36 and thus the curved surface 35 extends for less than 90° with respect to a horizontal plane while the curved surface 29 on the closure extends about 90°. Radius $R_1$ is preferably equal to radius $R_2$.

The closure 20 further includes interrupted threads on the inner surface of skirt 22 defining venting axial grooves 38 for venting the pressure as the closure 20 is unthreaded from the threads 39 on the container 21, in a manner well known in the art. Interrupted threads are also preferably provided on the finish of the associated container if it is made of plastic.

The plastic beverage closure is also preferably provided with a tamper indicating band B (FIG. 3) which may be of any well known type but is preferably that shown and claimed in U.S. application Ser. No. 07/386,391 filed Jul. 27, 1989 incorporated by reference. The tamper indicating band is attached to the skirt by a plurality of weakened portions defining a line of severing. An annular flange extends axially upwardly and inwardly from the tamper indicating band toward the base wall of the closure and comprises a first continuous annular flange portion connected to the band by a hinge portion and a second portion which has free ends of the segment portions engaging beneath the bead on the container when the closure is threaded onto the container. In one form the second portion comprises a plurality of segment portions extending upwardly and inwardly from the first continuous portion. In another form, the second portion comprises a second continuous flange portion. The flange is bent intermediate its ends so that the second portion extends inwardly at a greater angle than the first continuous flange portion.

Other types of tampering indicating bands may also be used, as is well known in the art.

The liner material may comprise any known material that can be extruded and cut off to provide changes for compression molding an apparatus such as shown, for example, in U.S. Pat. Nos. 3,955,605, 4,080,136 and 4,277,431. The liner material must also match other closure requirements including satisfactory removal torques, carbonation retention, carbonation retention under top load and satisfactory functioning on a container when cycled through environmental changes of temperature and humidity. A satisfactory material is a blend of an ethylene vinyl arcuate composition and a thermoplastic elastomeric composition, such as that of U.S. Pat. No. 4,984,703 incorporated herein by reference. Such a composition will function satisfactorily for glass containers as well as plastic containers. Other types of materials that function satisfactorily are ethylene vinyl acetate compositions and thermoplastic compositions.

In use, the plastic beverage closure 20 is applied to a container C after it has been filled and the closure is threaded onto the finish F at a predetermined torque. When a user desires to access the beverage, the user unthreads the closure causing the tamper indicating band to be severed. As the closure is being unthreaded, the seal is first released and the contents vented before the threaded are disengaged.

It has been found through testing that a plastic beverage closure embodying the invention provides a seal on the top surface and corner outer radius of the container without the necessity of a seal along the cylindrical side surface of the finish of the container, as heretofore been thought to be necessary for a satisfactory beverage closure both in metal and plastic closures. In addition, the plastic beverage closure embodying the invention has been found to provide for venting of the pressure in the container during the time when there is maximum contact between the threads of the closure and the threads of the container, within the first portion of rotation of the closure removal. It has been found that the venting occurs within the first about 45° of rotation.

Figure 9:
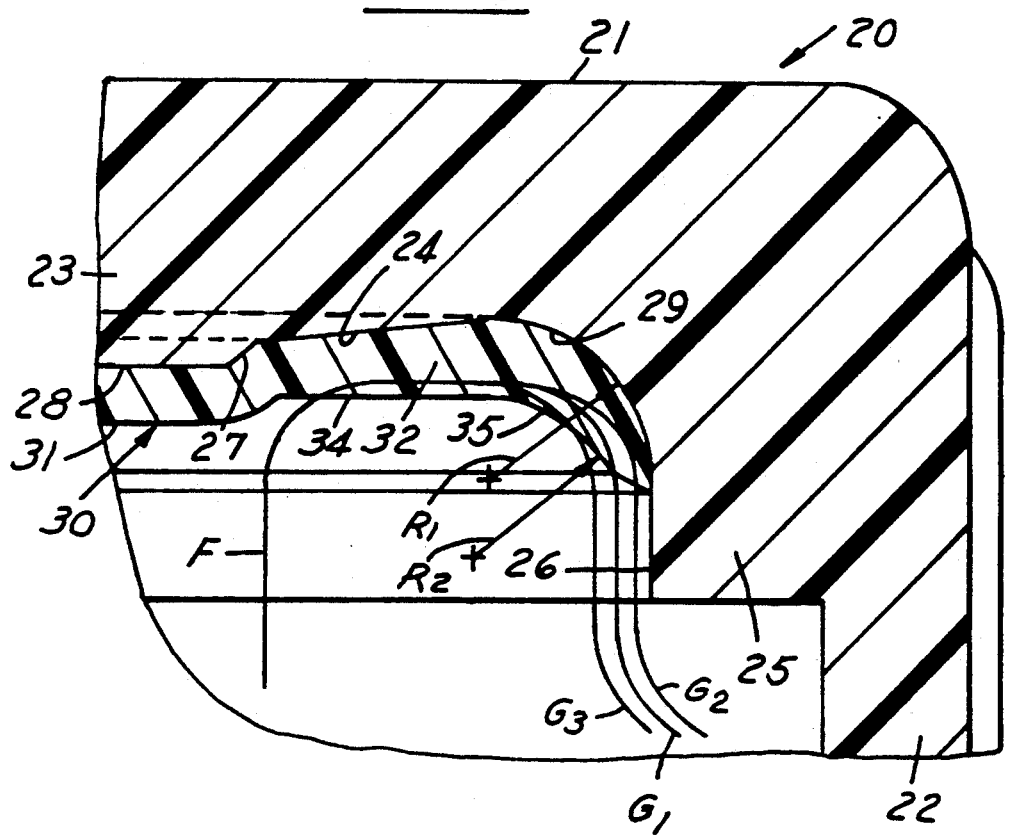
FIG. 9 is a diagrammatic view of the plastic carbonated beverage closure.

As shown in FIG. 9, which is a diagrammatic view, the closure embodying the invention is able to accommodate the tolerances in glass manufacture of glass containers, provide a satisfactory seal and meet the objective of satisfactory early venting. The lines show the nominal dimension $G_1$ maximum dimension $G_2$ and minimum dimension $G_3$.

Figure 10:
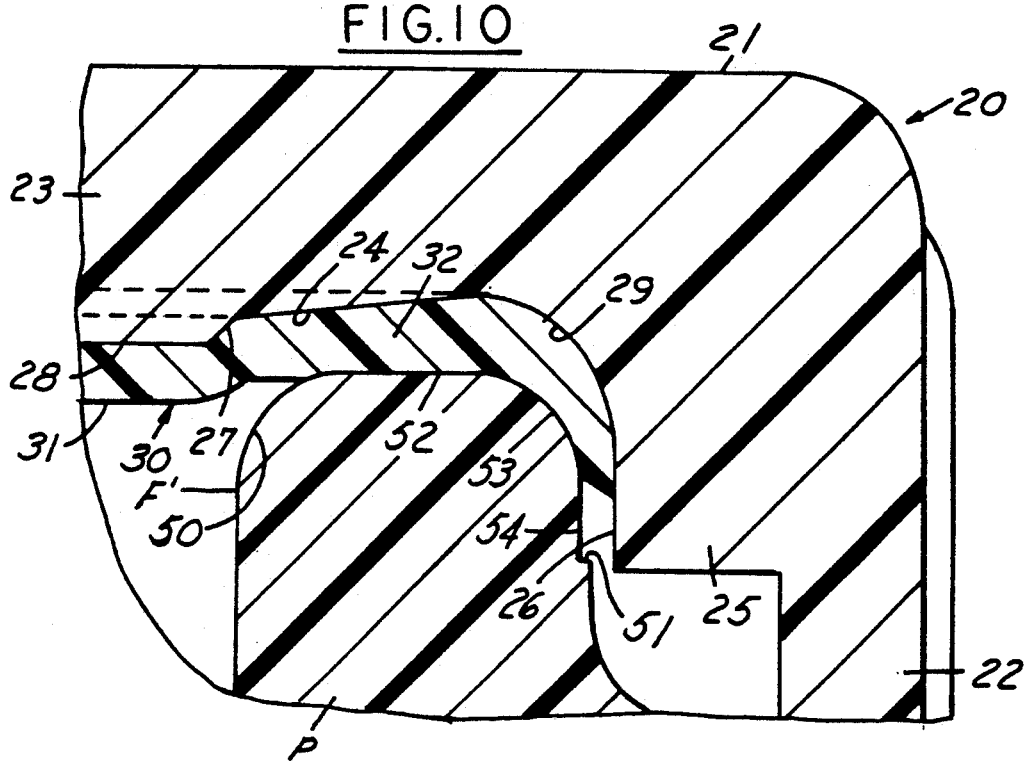
FIG. 10 is a part sectional view of a closure on a plastic container.
Figure 11:
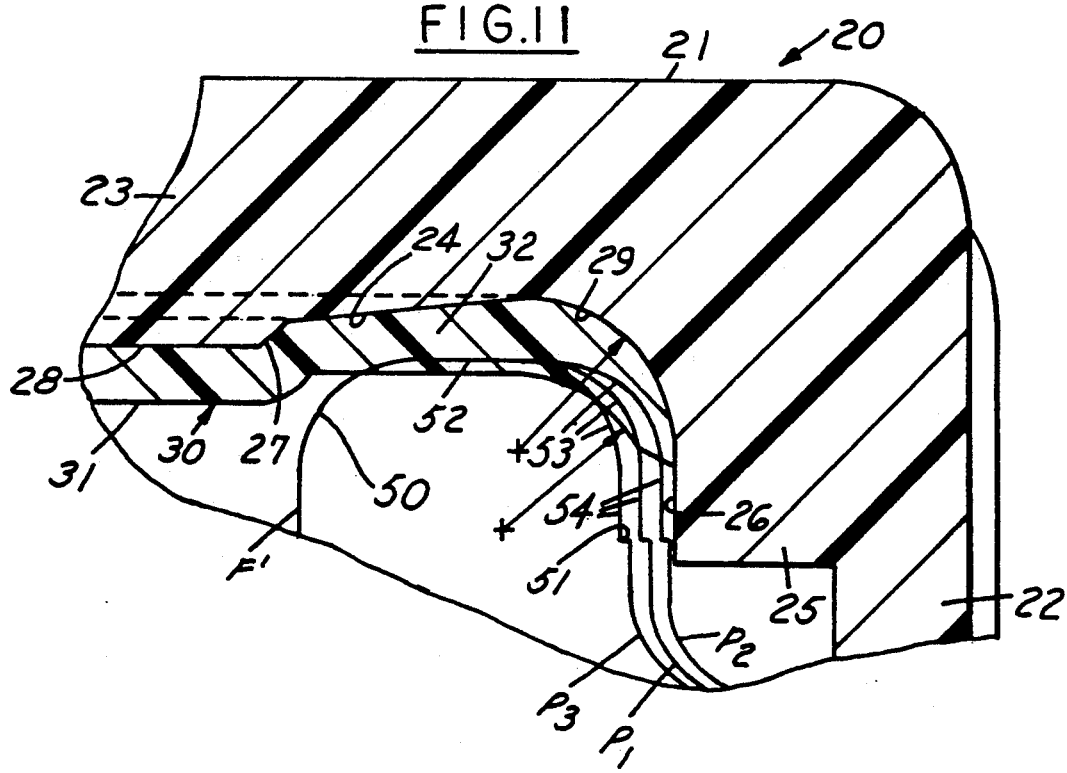
FIG. 11 is a diagrammatic view of the closure shown in FIG. 10.

As shown in FIGS. 10 and 11, the closure functions satisfactorily on plastic containers P. In this application, as is well known, plastic beverage containers are made by injection blow molding or reheat blow molding wherein a parison is first injection molded to form the finish and a hollow blowable body. In injection molding the top of the finish F' is formed by a one-piece locking ring mold that has a continuous annular cavity to form a seamless upper end 50. The remainder of the finish F' is formed by split molds that are closed and locked by the locking ring. This forms a small annular seam 51, shown enlarged in FIG. 10. The finish 50 includes a flat top surface 52 and an arcuate surface 53 merging with the flat surface 51 and a cylindrical surface 53. It may be noted that the closure does not have a liner that extends or contacts the seam 51.

As shown in FIG. 11, which is a diagrammatic view, the closure embodying the invention is able to accommodate the tolerances in plastic containers, provide a satisfactory seal and meet the objective of satisfactory early venting. The lines show the nominal dimension $P_1$, maximum dimension $P_2$ and minimum dimension $P_3$.

In a typical example of a 28 mm closure, the closure was made of polypropylene and the liner comprised ethylene vinyl acetate. The closure had the following dimensional relationships: Diameter of surface 26=0.996"; thickness of liner at intersection of surface 34 and 35 and intersection of surface 24 and 29=0.022"; radius $R_1$=0.040"; radius $R_2$=0.040"; diameter of lower edge of surface 35 at free edge 36=0.969"; axial height of surface 26 from the lower edge to the intersection of surfaces 24 and 29=0.075".

Such a plastic beverage closure functions satisfactorily on a glass container finish having the following dimensions: Diameter of outer cylindrical surfaces=0.978"; width of top surface=0.069 min.; radius of outer arcuate corner between the top surface and cylindrical surfaces=0.031".

Such a plastic beverage closure functions satisfactorily on a PET container finish having the following dimensions: Diameter of outer cylindrical surfaces=0.982"; width of top surface=0.060"; radius of outer arcuate corner between the top surface and cylindrical surfaces=0.025"; axial distance between top surface and annular seam 51=0.045".

Tests of the plastic beverage closure having the dimensions set forth on the above-identified glass container finish and PET container finish indicate that there was a 100% effectiveness in what is known as a constant force top load test applied to a carbonated beverage; a secure seal test; a carbon dioxide retention test at 70°; and a carbon dioxide retention test at 108°.

The constant force top load test consists of conditioning a carbonated package for three days at 100° F., placing the package in a press with a force gage on top of the closure and applying 100 psi to determine possible leakage.

The secure seal test is intended to determine whether proper closure/container contact is achieved. This test consists of applying pressure through an opening in the closure at 5 psi per second and holding the pressure at each level of 100 psi for one minute and 150 psi for one minute and observing at 175 psi. The standard is no leakage at the 100 psi or 150 psi level. In the case of plastic containers, the finish is pressurized internally in a fixture to adversely affect the side walls of a plastic container. The carbon dioxide retention test at 70° consists of storing carbonated packages at 70° for 12 weeks and checking the carbonation level in a Terris testing device at 1, 3, 6, 9 and 12 week intervals. The loss of carbonation is compared to a standard. The carbon dioxide retention test at 108° consists of storing carbonated packages at 108° for 3 days and checking the carbonation level in a Terris testing device. The loss of carbonation is compared to a standard.

This data can be summarized as follows:

| | |
|---|---|
| CONSTANT FORCE TOP LOAD DATA | 100% Pass @ 100° F. |
| SECURE SEAL DATA | No Leakage 125 psi, Pass 175 psi |
| 108° F. CO2 DATA | <2% CO2 loss |
| CO2 RETENTION | No loss 1st week/ <15% CO2 loss total |

Figure 12:
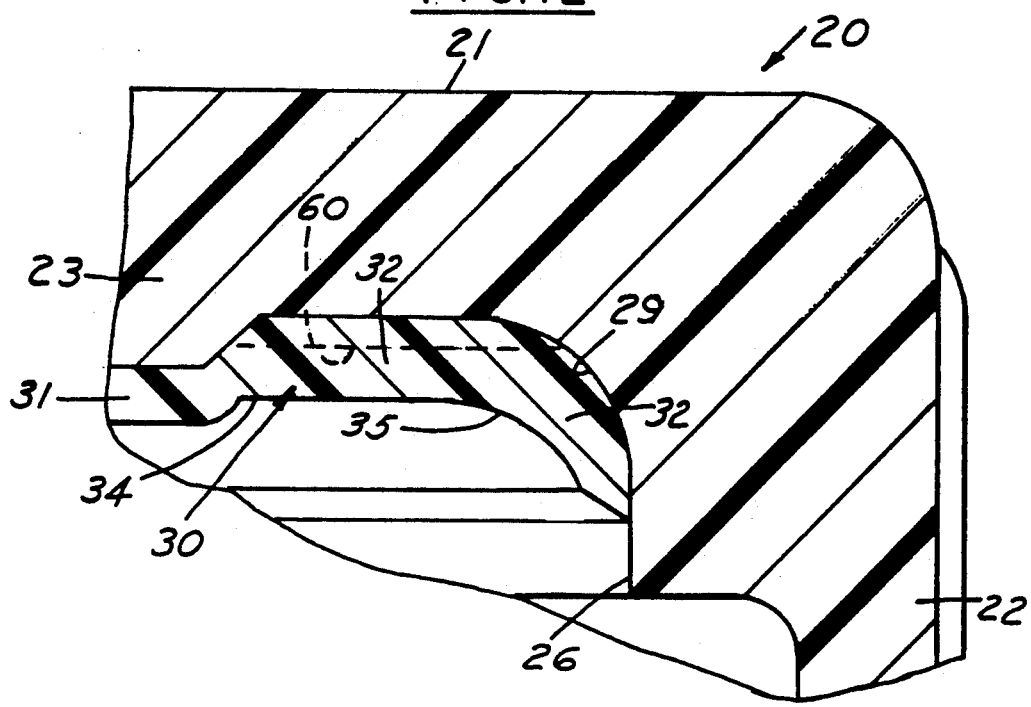
FIG. 12 is a part sectional view of a modified form of closure.

In the form shown in FIG. 12 the continuous taper in the bottom of the channel is omitted and the channel is formed with circumferentially spaced radial ribs 60.

Figure 13:
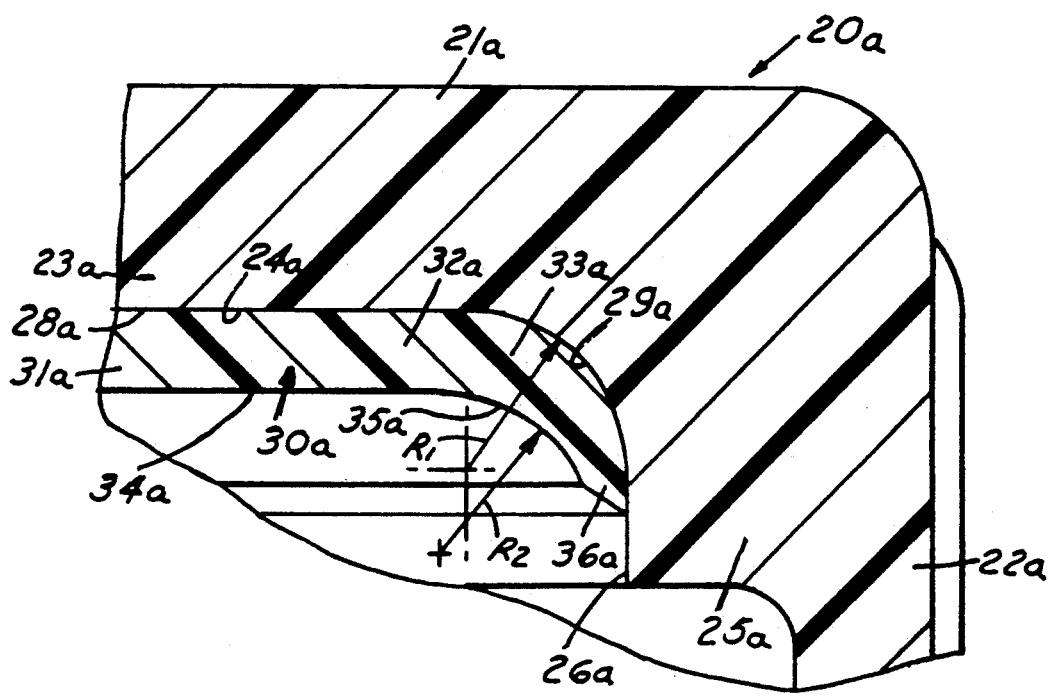
FIG. 13 is a part sectional view of a further modified form of closure.

In the modified form of closure shown in FIG. 13, the base wall 21a of the closure has uniform thickness corresponding to the thickness of the central portion 23 in the other forms of closure. This substantially increases the rigidity of the base wall 21a. Thus, the planar surface 28a of the base wall 21a and the annular liner receiving surface 24a are coplanar. In all other respects, the closure including the sealing liner is the same as the previous forms of the invention.

It can thus be seen that there has been provided a plastic beverage closure has a seal which will effectively protect the contents of the container which are under pressure; wherein the closure effectively vents the contents of the container with a minimal rotation of the closure; which the closure is operable on both glass and plastic containers; wherein the liner material may be of a broad range of materials; which does not require an annular lip on the closure for retaining the sealing liner that might interfere with either the glass or plastic container finish; and which does not rely on a seal with the outer cylindrical surface of the finish of the container.

We claim:

1. A plastic beverage closure for a container which has a finish with a top surface portion a cylindrical outer surface portion and a curved portion at the juncture of the top surface portion and the outer surface portion, said closure comprising a base wall, a peripheral skirt having an inner surface, interengaging means on said inner surface of said skirt for engaging the container, said interengaging means being adapted to engage the container such that relative rotational movement is required to disengage the closure from the container, said base wall of said closure having an inner surface with a central portion and an annular liner receiving portion surrounding said central portion, said skirt of said closure having a radially thickened portion extending radially inwardly from the inner surface of said skirt and defining a cylindrical surface extending toward the base wall, said closure having an annular concave surface at the juncture of the base wall and said skirt and merging with said annular liner receiving portion and said cylindrical surface, said concave surface merging tangentially with said cylindrical surface, a compression molded liner engaging and being bonded to the inner surface of said central portion, said annular liner receiving portion, said concave surface and said cylindrical surface, said liner having a central portion overlying said central portion of said base wall of said closure, said annular liner receiving portion of said closure, said concave surface of said closure and a portion of said cylindrical surface of said closure, said liner having an exterior planar surface in the portion adapted to overlie and engage the top surface of the finish, a concave arcuate surface and a free edge contacting and terminating on the cylindrical surface of said closure, said arcuate surface on said liner having a configuration and cooperating with said concave surface on said closure such that said liner has its greatest radial thickness from a point along a central axis that is disposed horizontally below the base wall of the closure in the portion of the liner between the annular liner receiving portion and the free edge of said liner, said arcuate surface on the liner being adapted to engage the curved portion of the finish at the juncture of the top surface portion and the outer surface portion of the finish, said arcuate surface of said liner terminating substantially in advance of any cylindrical outer surface portion on the finish of the container, said interengaging means of the closure being interrupted to provide for venting of the contents ofh te container as the closure is being unthreaded from the container.

2. The closure set forth in claim 1 wherein said annular liner receiving portion comprises a channel and said central portion comprises an axially thickened portion, said closure having an annular portion which tapers radially and axially inwardly from said channel to said thickened portion.

3. The closure set forth in claim 2 wherein said liner includes a portion merging gradually between said portion overlying said central portion of said closure and said channel.

4. The closure set forth in claim 3 wherein said annular concave surface on said closure has a radius $R_1$ and said annular concave surface on said liner has a radius $R_2$, wherein the angular extent of $R_1$ is greater than $R_2$.

5. The closure set forth in claim 4 wherein the angular extent of radius $R_1$ is about 90° and the angular extent of radius $R_2$ is less than 90° such that said gradually merging portion of the surface of the liner is not axially tangent to any cylinder passing through the free edge.

6. The closure set forth in claim 5 wherein the radii $R_1=R_2$, the center of radius $R_1$ being axially and radially displaced such that the radially thicker portion of said liner is nearer said channel than said cylindrical surface of said closure.

7. The closure set forth in claim 1 wherein said central portion of the base wall of the closure and annular liner receiving portion on the base wall of the closure are coplanar.

8. The closure set forth in claim 7 wherein said annular concave surface on said closure has a radius $R_1$ and said annular concave surface on said liner has a radius $R_2$, wherein the angular extent of $R_1$ is greater than $R_2$.

9. The closure set forth in claim 8 wherein the angular extent of radius $R_1$ is about 90° and the angular extent of radius $R_2$ is less than 90° such that said gradually merging portion of the surface of the liner is not axially tangent to any cylinder passing through the free edge.

10. The closure set forth in claim 9 wherein the radii $R_1=R_2$, the center of radius $R_1$ being axially and radially displaced such that the radially thicker portion of said liner is nearer said channel than said cylindrical surface of said closure.

11. The closure set forth in any one of claims 1-10 and a container which comprises a glass container having a finish top surface, an outer cylindrical surface and an arcuate surface joining said top surface and cylindrical surface, said liner providing a seal only with said top surface and arcuate surface.

12. The closure set forth in any one of claims 1-10 and a container which comprises a plastic container, said container having a finish with a top surface, a continuous seamless outer surface terminating in an annular seam and an annular convex surface joining the top surface and an outer side surface, said liner providing a seal with said top surface and continuous seamless outer surface only.

13. A plastic beverage closure for a container which has a finish with a top surface portion a cylindrical outer surface portion and a curved portion at the juncture of the top surface portion and the outer surface portion, said closure comprising a base wall, a peripheral skirt having an inner surface, interengaging means on said inner surface of said skirt for engaging the container, said interengaging means being adapted to engage the container such that relative rotational movement is required to disengage the closure from the container, said base wall of said closure having an inner surface with a central portion and an annular liner receiving portion surrounding said central portion, said skirt of said closure having a radially thickened portion extending radially inwardly from the inner surface of said skirt and defining a cylindrical surface extending toward the base wall, said closure having an annular concave surface at the juncture of the base wall and said skirt and merging with said annular liner receiving portion and said cylindrical surface, a compression molded liner engaging and being bonded to the inner surface of said central portion, said annular liner receiving portion, said concave surface and said cylindrical surface, said concave surface merging tangentially with said cylindrical surface, said liner having a central portion overlying said central portion of said base wall of said closure, said annular liner receiving portion of said closure, said concave surface of said closure and a portion of isad cylindrical surface of said closure, said liner having an exterior planar surface in the portion adapted to overlie and engage the top surface of the finish, a concave arcuate surface and a free edge contacting the cylindrical surface on said closure, said arcuate surface on said liner having a configuration and cooperating with said concave surface on said closure such that said liner has its greatest radial thickness from a point along a central axis that is disposed horizontally below the base wall of the closure in the portion of the liner between the annular liner receiving portion and the free edge of said liner, said arcuate surface on the liner being adapted to engage the curved portion of the finish at the juncture of the top surface portion and the outer surface portion of the finish, said free edge of said liner terminating substantially in advance of any cylindrical outer surface portion on the finish of the container, said interengaging means of the closure being interrupted to provide for venting of the contents of the container as the closure is being unthreaded from the container, said annular liner receiving portion comprising a channel and said central portion comprising an axially thickened portion, said closure having an annular portion which tapers radially and axially inwardly form said channel to said thickened portion.

14. The closure set forth in claim 13 wherein said liner includes a portion merging gradually between said portion overlying said central portion of said closure and said channel.

15. The closure set forth in claim 14 wherein said annular concave surface on said closure has a radius $R_1$ and said annular concave surface on said liner has a radius $R_2$, wherein the angular extend of $R_1$ is greater than $R_2$.

16. The closure set forth in claim 15 wherein the angular extent of radius $R_1$ is about 90° and the angular extent or radius $R_2$ is less than 90° such that said gradually merging portion of the surface of the liner is not axially tangent to any cylinder passing through the free edge.

17. The closure set forth in claim 16 wherein the radii $R_1 = R_2$, the center of radius $R_1$ being axially and radially displaced such that the radially thicker portion of said liner is nearer said channel than said cylindrical surface of said closure.

18. The closure set forth in claims 13-17 and a container which comprises a glass container having a finish top surface, an outer cylindrical surface and an arcuate surface joining said top surface and cylindrical surface, said liner providing a seal only with said top surface and arcuate surface.

19. The closure set forth in claims 13-17 and a container which comprises a plastic container, said container having a finish with a top surface, a continuous seamless outer surface terminating in an annular seam and an annular convex surface joining the top surface an outer side surface, said liner providing a seal with said top surface and continuous seamless outer surface only.

20. A plastic beverage closure for a container which has a finish with a top surface portion a cylindrical outer surface portion and a curved portion at the juncture of the top surface portion and the outer surface portion, said closure comprising a base wall, a peripheral skirt having an inner surface, interengaging means on said inner surface of said skirt for engaging the container, said interengaging means being adapted to engage the container such that relative rotational movement is required to disengage the closure from the container, said base wall of said closure having an inner surface with a central portion and an annular liner receiving portion surrounding said central portion, said skirt of said closure having a radially thickened portion extending radially inwardly from the inner surface of said skirt and defining a cylindrical surface extending toward the base wall, said closure having an annular concave surface at the juncture of the base wall and said skirt and merging with said annular liner receiving portion and said cylindrical surface, a compression molded liner engaging and being bonded to the inner surface of said central portion, said annular liner receiving portion, said concave surface and said cylindrical surface, said concave surface merging tangentially with said cylindrical surface, said liner having a central portion overlying said central portion of said base wall of said closure, said annular liner receiving portion of said closure, said concave surface of said closure and a portion of isad cylindrical surface of said closure, said liner having an exterior planar surface in the portion adapted to overlie and engage the top surface of the finish, a concave arcuate surface and a free edge contacting the cylindrical surface on said closure, said arcuate surface on said liner having a configuration and cooperating with said concave surface on said closure such that said liner has its greatest radial thickness from a point along a central axis that is disposed horizontally below the base wall of the closure in the portion of the liner between the annular liner receiving portion and the free edge of said liner, said arcuate surface on the liner being adapted to engage the curved portion of the finish at the juncture of the top surface portion and the outer surface portion of the finish, said free edge of said liner terminating substantially in advance of any cylindrical outer surface portion on the finish of the container, said interengaging means of the closure being interrupted to provide for venting of the contents of the container as the closure is being unthreaded from the container, said central portion of the base wall of the closure and annular liner receiving portion on the base wall of the closure being coplanar.

said annular concave surface on said closure having a radius $R_1$ and said annular concave surface on said liner having a radius $R_2$, wherein the angular extent of $R_1$ is greater than $R_2$, the angular extent of radius $R_1$ being about 90° and the angular extent of radius $R_2$ being less than 90° such that said gradually merging portion of the surface of the liner being not axially tangent to any cylinder passing through the free edge.

21. The closure set forth in claim 20 wherein the radii $R_1 = R_2$, the center of radius $R_1$ being axially and radially displaced such that the radially thicker portion of said liner is nearer said channel than said cylindrical surface of said closure.

22. The closure set forth in claim 20, 21 and a container which comprises a glass container having a finish top surface, an outer cylindrical surface and an arcuate surface joining said top surface and cylindrical surface, said liner providing a seal with said top surface and arcuate surface.

23. The closure set forth in claim 20, 21 and a container which comprises a plastic container, said container having a finish with a top surface, a continuous seamless outer surface terminating in an annular seam and an annular convex surface joining the top surface and outer side surface, said liner providing a seal with said top surface and continuous seamless outer surface only.

24. A plastic closure for a container which has a finish with a top surface portion a cylindrical outer surface portion and a curved portion at the juncture of the top surface portion and the outer surface portion, said closure comprising a base wall, a peripheral skirt having an inner surface, interengaging means on said inner surface of said skirt for engaging the container, said interengaging means being adapted to engage the container such that relative rotational movement is required to disengage the closure from the container, .

said base wall of said closure having an inner surface with a central portion and an annular liner receiving portion surrounding said central portion, said skirt of said closure having a radially thickened portion extending radially inwardly from the inner surface of said skirt and defining a cylindrical surface extending toward the base wall, said closure having an annular concave surface at the juncture of the base wall and said skirt and merging with said annular liner receiving portion and said cylindrical surface, a compression molded liner engaging and being bonded to the inner surface of said central portion, said annular liner receiving portion, said concave surface and said cylindrical surface, said concave surface merging tangentially with said cylindrical surface, said liner having a central portion overlying said central portion of said base wall of said closure, said annular liner receiving portion of said closure, said concave surface of said closure and a portion of isad cylindrical surface of said closure, said liner having an exterior planar surface in the portion adapted to overlie and engage the top surface of the finish, a concave arcuate surface and a free edge contacting the cylindrical surface on said closure, said arcuate surface on said liner having a configuration and cooperating with said concave surface on said closure such that said liner has its greatest radial thickness from a point along a central axis that is disposed horizontally below the base wall of the closure in the portion of the liner between the annular liner receiving portion and the free edge of said liner, said arcuate surface on the liner being adapted to engage the curved portion of the finish at the juncture of the top surface portion and the outer surface portion of the finish, said free edge of said liner terminating substantially in advance of any cylindrical outer surface portion on the finish of the container.

25. The closure set forth in claim 24 wherein said annular liner receiving portion comprises a channel and said central portion comprising an axially thickened portion.

26. The closure set forth in claim 25 wherein said closure has an annular portion which tapers radially and axially inwardly from said channel to said thickened portion.

27. The closure set forth in claim 24 wherein said liner includes a portion merging gradually between said portion overlying said central portion of said closure and said channel.

28. The closure set forth in claim 27 wherein said annular concave surface on aid closure has a radius $R_1$ and said annular concave surface on said liner has a radius $R_2$, wherein the angular extend of $R_1$ is greater than $R_2$.

29. The closure set forth in claim 28 wherein the angular extent of radius $R_1$ is about 90° and the angular extent or radius $R_2$ is less than 90° such that said gradually merging portion of the surface of the liner is not axially tangent to any cylinder passing through the free edge.

30. The closure set forth in claim 29 wherein the radii $R_1=R_2$, the center of radius $R_1$ being axially and radially displaced such that the radially thicker portion of said liner is nearer said channel than said cylindrical surface of said closure.

31. The closure set forth in any one of claims 24–30 and a container which comprises a glass container having a finish top surface, an outer cylindrical surface and an arcuate surface joining said top surface and cylindrical surface, said liner providing a seal only with said top surface and arcuate surface.

32. The closure set forth in any one of claims 24–30 and a container which comprises a plastic container, said container having a finish with a top surface, a continuous seamless outer surface terminating in an annular seam and an annular convex surface joining the top surface and outer side surface, said liner providing a seal with said top surface and continuous seamless outer surface only.

* * * * *